March 20, 1973  J. R. NARBAITS-JAUREGUY  3,721,499
NAVIGATING AND LANDING DEVICE FOR AIRCRAFT
Filed June 30, 1966  3 Sheets-Sheet 1
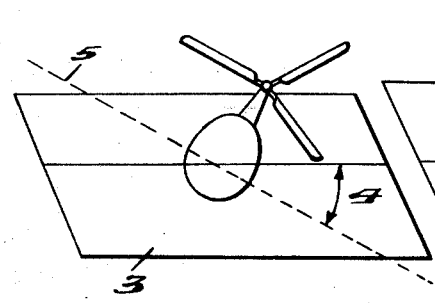
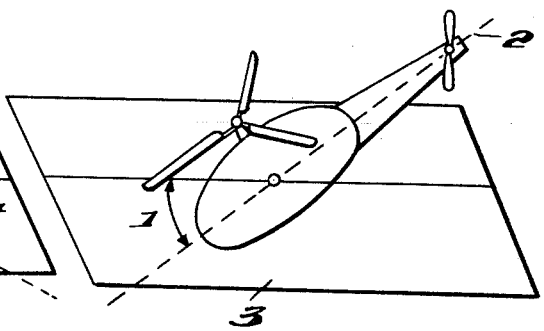
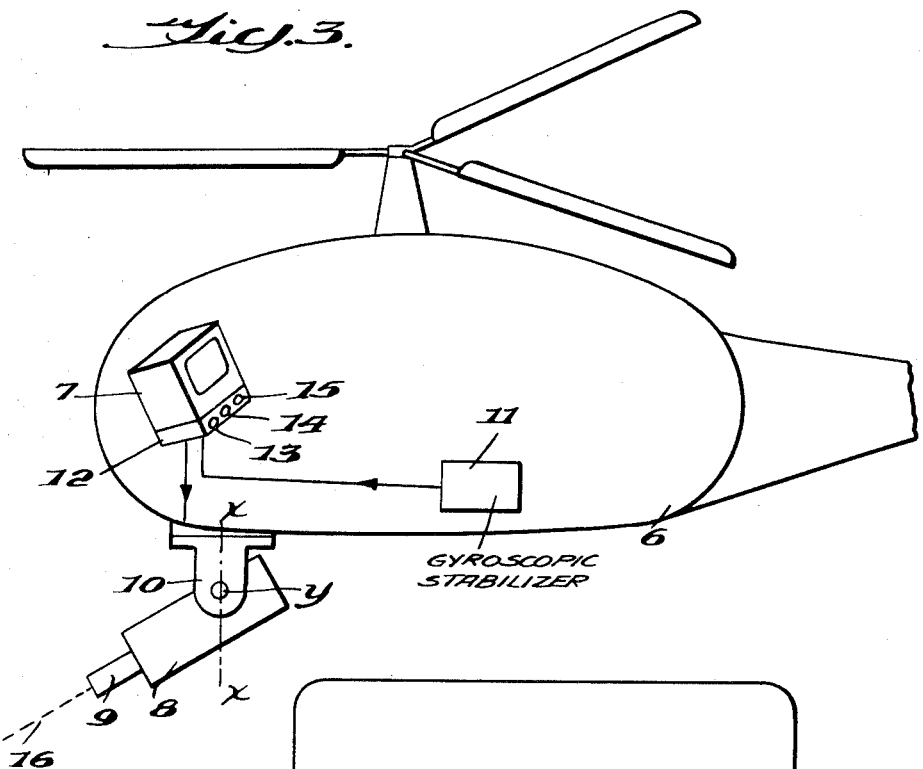
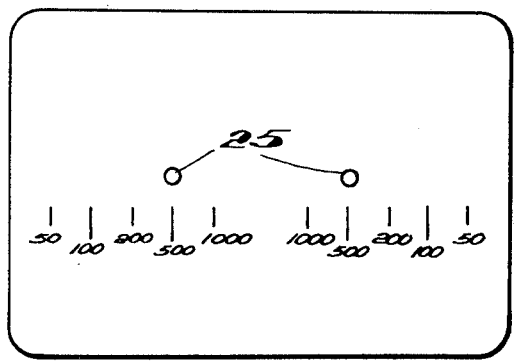
INVENTOR
BY JEAN RAYMOND NARBAITS-
JAUREGUY
ATTORNEY

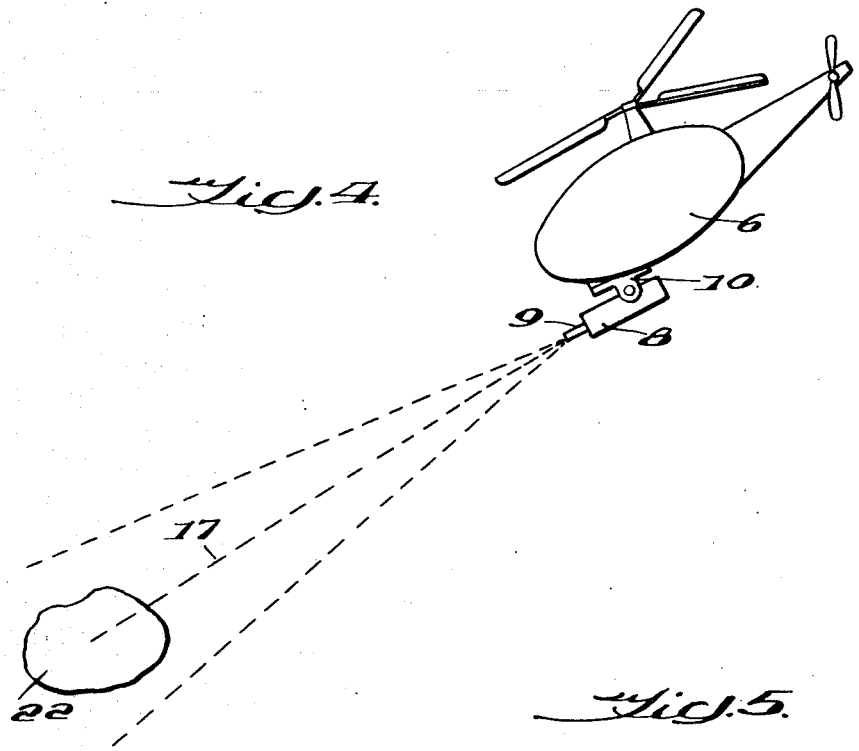
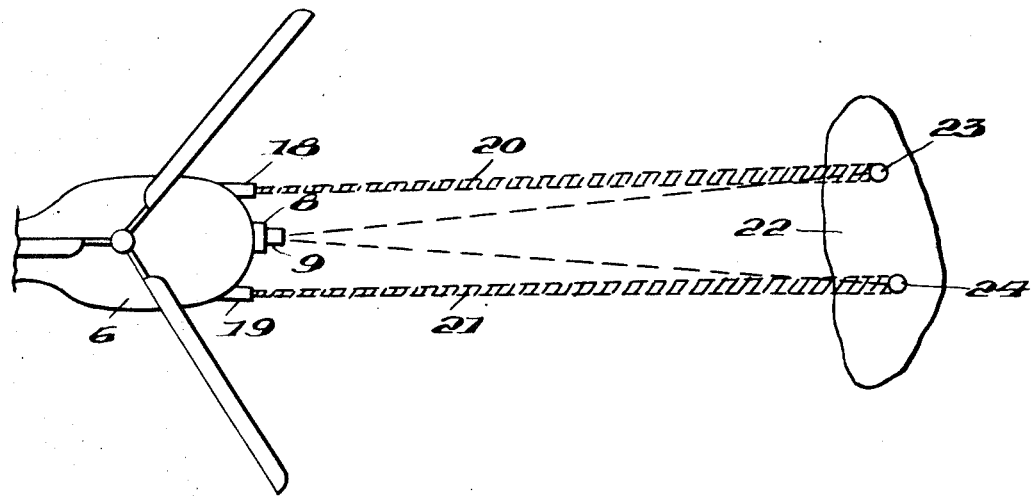

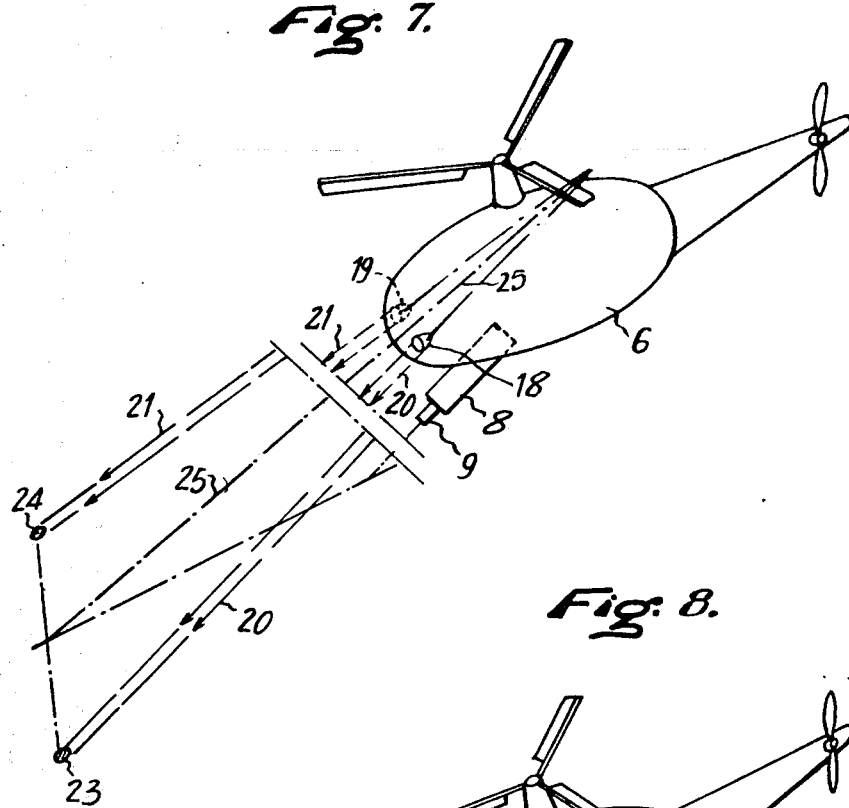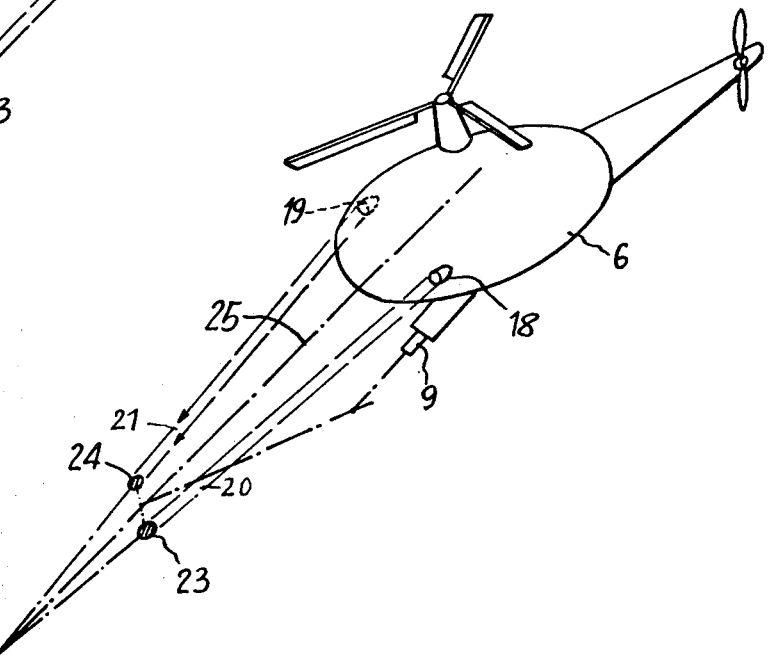

United States Patent Office 3,721,499
Patented Mar. 20, 1973

3,721,499
NAVIGATING AND LANDING DEVICE
FOR AIRCRAFT
Jean Raymond Narbaits-Jaureguy, 1 Rue Louis Mercier,
Malakoff, France
Filed June 30, 1966, Ser. No. 562,947
Int. Cl. G01b 11/26; G01c 1/00
U.S. Cl. 356—152                                    2 Claims

ABSTRACT OF THE DISCLOSURE

A device for night navigation of aircraft has a television camera carried by the aircraft the axis of which is stabilized with respect to the ground. A video monitor is provided with scales on which the camera shows the images of two light beams projected from the aircraft. The beams are divergent and convergent.

---

The present invention relates to an improvement in the combination of piloting means forming a unit, forming the object of the patent application No. 465,796 of June 21, 1965, by which it is possible for the pilot of an aerodyne to navigate and to land his craft correctly during the night on a landing ground selected by himself.

The invention aims principally at making any recourse to piloting means located on the ground unnecessary, and at making it possible to operate without indiscrete lighting.

The device of patent application No. 465,796 of June 21, 1965, comprises in combination an ultra-sensitive television camera carried by the aerodyne; means for selecting and stabilising the observation axis of the camera in a direction which is fixed in relation to the ground; a video monitor disposed in front of the pilot of the aerodyne; means for assessing the distances of objects seen on the ground by means of the camera.

The preferred form of telemeter in the above-mentioned application comprises two light projectors, preferably with infra-red lighting, projecting on the ground light beams which are linear and parallel, orientated in the observation axis of the camera by the stabilisation means of the latter; it further comprises the said camera and the said video monitor and a scale on the screen of the video monitor.

The present improvement consists in giving the beams of the projectors located in the one plane an angular position that is mutually regulatable. The scales for reading the distance of the spots of light projected on the ground by the projectors are of course selected in accordance with the angle of convergence of the beams of the projectors.

The improvement consists in that the axes of the beams are convergent in front of or behind the aerodyne, and that the bisectrix of the beams of the projectors is orientated in accordance with the observation axis of the camera, by the stabilisation means of the latter.

The angle of convergence of the beams can furthermore be regulated, and the scale intended for the measurement of the interval of the images of the light spots cast by the projectors on the ground is selected as a function of the said angle of convergence.

The main aim of this improvement is to adjust the relative spacing of the light spots on the ground in accordance with the distance between the aircraft and the said spots. With great distance, one would prefer to diverge the projectors to increase the spacing of the spots and obtain on the screen of the minitor two clearly distinct images of the spots. When the distance is slight, in particular when the aircraft is flying at low altitude, on the other hand, it is preferred and sometimes essential to cause the beams of the projectors to converge, so that the light spots projected on the ground give on the screen of the monitor images that are visible simultaneously on the said screen.

The drawings show the subject matter of the invention in FIGS. 7 and 8, while FIGS. 1 to 6 shows the subject matter of the prior application.

In these drawings:

FIG. 1 is a diagrammatic view from the front of an aircraft in flight, here a helicopter.

FIG. 2 is a diagrammatic lateral view of the same aircraft in flight.

FIG. 3 is a lateral diagrammatic view showing the elements constituting the landing device.

FIG. 4 shows diagrammatically the aircraft in flight, and its landing area.

FIG. 5 is a top view of the aircraft in the course of landing, with a diagrammatic representation of its optical telemeter.

FIG. 6 shows the video monitor.

FIGS. 7 and 8 show in perspective two modifications of the present invention.

The device in accordance with the prior application has the feature that it puts into operation conjointly the following means:

(1) An ultra-sensitive television camera which gives video signals of the landscape, illuminated by the residual light which is present even on the blackest night.

(2) Gyroscopic stabilizing equipment defining perpendicular reference axes, of fixed direction in relation to the ground. The said equipment is known per se, and it makes it possible for the pilot to establish and transmit a stabilized observation line to the camera, the orientation of said observation line being determined in relation to axes of reference. Incidentally, it is noted that the stabilization, if it bears directly on the camera in its unit, eliminates the blurring and the loss of definition of the image which are the cause of vibrations of the aircraft.

(3) A video monitor, i.e. a television screen, connected by cable to the camera, disposed in front of the pilot who thus observes the image transmitted by the camera.

(4) An optical telemeter, the nature of which is specified below.

The expressions "angle of inclination" or "inclination" and "angles of slope" or "slope" used below are defined as follows in relation to the aircraft as seen in FIGS. 2 and 3.

The straight lines 2 and 5 are located in a horizontal plane of the craft, when said craft is in horizontal flight; the straight line 2 is in the plane of symmetry of the aircraft and the straight line 5 is perpendicular to the straight line 2. The "slope," as seen in FIG. 2, is the angle 1 between 2 and the horizontal plane 3. The "inclination," as seen in FIG. 1, is the angle 4 of the line 5 and of the horizontal plane 3.

In the aircraft as seen in FIG. 3, the pilot has in front of his eyes the video monitor 7. In front of the aircraft a camera 8 with a lens 9 of variable focus, which can be controlled by the pilot, is fixed to the support member 10. In a first solution, the support 10 is orientatable about an axis x—x, substantially vertical when the aircraft is in horizontal flight. The said support member carries the camera by means of the horizontal bearings of the axle y. The camera is accordingly orientated by the support 10 which receives its order from the gyroscopic stabilizing equipment 11. In another known solution, the camera is rigidly fixed to the aircraft, and a mirror or a light-deflecting prism is disposed in front of the lens which receives the desired movements from the stabilizer, so as to keep on observation line of fixed orientation in relation to the ground.

The gyroscopic stabilizer is itself controlled by control dials 13, 14, 15 disposed for example on the box 12, under the video monitor, said dials orientatably posting the values of slope and course in relation to stabilized axes, to be given to the observation line 17 of the camera.

During navigation, the pilot can observe a part of the landscape, and as the observation axis is known, can localize his position and reset his navigating instruments by referring to characteristic features of the terrain.

When the pilot has reached the zone where he has to land, he locates his landing ground 22 by means of the camera, *a* in FIG. 2, then, taking into account his position and the characteristics of his craft, he posts on the box 12 for controlling the position of the camera the values of inclination of the aircraft, of the course and of the slope, of the line of descent suitable for the landing which he has to carry out.

If the pilot, in making his landing approach, controls his machine in such a way as to keep in the center of the video monitor the image of the landing area selected, he will land by following substantially the line of descent 17.

By actuating the lens by television control, he will be able to give the landscape observed or to the landing area the most suitable dimensions for observation and accordingly for the satisfactory carrying out of his operation.

To operate with surety, it is advisable to assess the distance from the craft to the landing strip 22. This can be done in an approximation by comparing the images of known objects, trees, houses, and so on, on the video monitor, which carries, as is known, scales as a function of focal distances from the lens of the camera.

The distance may be difficult to assess in the case of a terrain bare of objects which could be used for assessing dimensions.

In all cases it is possible to make use of an optical telemeter in accordance with the invention, as in FIG. 5. The said telemeter is comprised of two projectors, preferably with infra-red light emission, 18 and 19, disposed in front of the aircraft. The said projectors emit onto the ground infra-red light beams that are linear and parallel to each other, 20 and 21, and are controlled as regards slope and direction by the gyroscopic stabilizing equipment, in accordance with the observation line of the camera. The two spots 23 and 24, produced on the ground by the infra-red light beams are observed at 25 on the video monitor, as can be seen in FIG. 6, and the distance of the said spots from the aircraft can be read directly on a scale on the video monitor, graduated as a function of the spacing of the projectors 18 and 19 and of the focal distance from the lens of the camera.

The pilot can accordingly operate with precision up to the moment of contact with the ground.

Fog, mist, clouds produce diffraction and diffusion phenomena, the inconvenience of which can be considerably diminished by using coherent light projectors, such as lasers, gallium arsenide diodes and so on.

In the device according to the invention, an aircraft 6 such as a helicopter is equipped with a camera 8 having a lens 9. FIG. 7 shows two divergent beams 20 and 21 for the projectors 18 and 19, and FIG. 8 shows two beams 18 and 19 that are convergent. The bisectrix of the axes of the light beams is shown at 25.

The remainder of the apparatus follows that described in the patent application No. 465,796 of June 21, 1965.

I claim:

1. A device for night navigating and landing an aerodyne, by television, comprising in combination, a television camera carried by the aerodyne; means for selecting and stabilizing the observation axis of the camera in a direction which is fixed in relation to the ground; a video monitor disposed in front of the pilot of the aerodyne connected to said camera; means for assessing the distances of objects seen on the ground by means of the camera comprising scales located on the screen of the monitor and two light projectors carried by the aerodyne each projecting a linear light beam onto the ground, both of said beams being in the field of view of said camera, in which the axes of the beams are convergent in one direction, and the bisectrix of the beams of the projectors is oriented in accordance with the observation axis of the camera by the stabilization means of the latter.

2. A device as claimed in claim 1, in which means is provided to regulate the angle of convergence of the beams, and the scale intended for the measurement of the interval of the images of the light spots has graduations spaced as a function of the said angle of convergence.

References Cited
UNITED STATES PATENTS

| | | | |
|---|---|---|---|
| 2,225,046 | 12/1940 | Hunter | 88—1 U |
| 2,280,126 | 4/1942 | Metcalf | 88—1 U |
| 2,379,496 | 7/1945 | Saunier | 88—1 U |
| 2,417,446 | 3/1947 | Reynolds | 88—1 U |
| 2,719,470 | 10/1955 | Jensen | 88—1 T |
| 2,786,096 | 3/1957 | Palmer | 88—1 U |

BENJAMIN A. BORCHELT, Primary Examiner

H. A. BIRMIEL, Assistant Examiner

U.S. Cl. X.R.

178—DIG. 20; 250—203 CT